Patented May 4, 1937

2,079,324

UNITED STATES PATENT OFFICE 2,079,324

METHOD OF PRODUCING FERTILIZERS

Carl Krauch, Heidelberg, Carl Eyer, Ludwigshafen-on-the-Rhine, and Otto Schliephake, Mannheim, Germany, assignors to I. G. Farbenindustrie Aktiengesellschaft, Frankfort-on-the-Main, Germany No Drawing. Application December 23, 1933, Serial No. 703,830. In Germany April 18, 1928

12 Claims. (Cl. 71—60)

The present invention relates to the production of fertilizers containing ammonium nitrate, and the subject-matter of this application is a continuation-in-part of our application Ser. No. 353,671, filed April 8, 1929.

Repeated attempts have been made to mix ammonium nitrate with calcium carbonate, in order to improve the stability of the former, but the resulting products have proved unsatisfactory.

We have now found that excellent results are obtained by introducing ground or otherwise finely divided calcium carbonate into a hot concentrated solution of ammonium nitrate or into a melt of ammonium nitrate and solidifying the mass, when uniformly mixed, preferably by spraying, so that it solidifies in a finely divided state in the form of more or less regular, rounded granules. When restricting the water content of the components of the mixture so that the mixture contains at the most 10 per cent of water and thus solidifies with evaporation of but little water, reaction between the ammonium nitrate and the calcium carbonate does not take place or only to a surprisingly small extent, which is practically negligible. If the solid products thus obtained have an undesirable content of water they may be dried by warming, but only to below their melting point and preferably in a current of air, or other gas, whereby the smell of ammonia which sometimes adheres to the products, is also removed, small amounts of ammonium carbonate present on the surface of the particles being evaporated. At the same time the surface hardens to such a degree as to destroy the caking properties of the product. It is, however, preferable to reduce the water content of the components beforehand to such an extent that the mixture thereof contains only 6 or even 3 per cent of water so that the products can directly be stored. In these cases too, warming of the products to below their melting point is often advisable to expel the smell of ammonia. After the components have been thoroughly mixed, the melt should be solidified immediately in order to avoid loss of nitrogen.

The relative proportions of ammonium nitrate and calcium carbonate may be varied within wide limits, thus from 90 to 30 parts by weight of ammonium nitrate to from 10 to 70 parts by weight of calcium carbonate may be used. For most practical purposes, it is advisable not to employ more than about 70 parts by weight of ammonium nitrate to about 30 parts by weight of calcium carbonate. Since the mixture is preferably solidified by spraying, it must be fluid which is conveniently attained by employing an ammonium nitrate melt of a sufficiently high temperature that after the cold calcium carbonate has been admixed, the mixture is still fluid. The calcium carbonate may, however, also be previously warmed.

By means of the process according to the present invention an ammonium nitrate fertilizer can be produced containing up to about 31 per cent of nitrogen of perfectly uniform composition and not liable to segregation. Moreover, it is non-explosive, keeps in storing and is entirely inodorous, no smell of ammonia appearing even when a considerable amount of moisture has been absorbed.

The following examples will further illustrate the nature of the said invention which, however, is not restricted thereto. The parts are by weight.

Example 1

43 parts of precipitated and dried calcium carbonate, such as is obtained in the production of ammonium sulphate from gypsum, ammonia and carbon dioxide, are intimately mixed with 57 parts of a hot, about 93 per cent solution of ammonium nitrate. The melt, which contains 4 per cent of water, is solidified on cooled rollers and is then crushed to the desired grain size in a suitable apparatus. The screened product is then passed through a rotary tube furnace into which air at about 80° to 100° C. is admitted at the charging end. Finally, the product is cooled to ordinary temperature in a cooling drum. It then contains about 19 per cent of nitrogen, and is in the form of a granular fertilizer which can be stored and distributed satisfactorily.

Instead of solidifying the melt by means of a cooling drum it may also be converted by spraying into a solid granular product, which is then subjected to the supplementary heat treatment already described.

Example 2

1130 parts of finely divided calcium carbonate are introduced at between about 110° and 115° C., while stirring well, into 1000 parts of an ammonium nitrate melt containing about 8 per cent of water. The homogeneous melt, the solidification point of which is about 90° C., is then sprayed at about 110° C. A dry, readily spreadable product is obtained, which contains about 15.5 per cent of nitrogen and 25 per cent of calcium oxide. The product may then be further treated as described in Example 1.

*Example 3*

570 kilograms of calcium carbonate, for example, in the form of dry fertilizer lime powder are stirred into 1000 kilograms of a hot solution of ammonium nitrate of about 91 per cent strength, at about 120° C. After the lime has been thoroughly incorporated, the mixture which would solidify at about 95° C. is sprayed at about 110° to 120° C. In this way, a uniform and immediately distributable product is obtained in the form of fine globules having a compact surface and containing about 21 per cent of nitrogen.

*Example 4*

590 kilograms of lime for manuring (powdery calcium carbonate) are introduced, while stirring, into 1000 kilograms of a 92 per cent ammonium nitrate melt at about 100° C. The melt, the solidification point of which is about 90° C., is spurted at about 96° C. by means of a rotating device. The salt solidifies in the shape of elongated drops having smooth surfaces, and with a nitrogen content of about 21 per cent.

*Example 5*

400 kilograms of finely divided cold calcium carbonate are thoroughly mixed with 600 kilograms of a hot ammonium nitrate melt of 94.5 per cent strength. The mixture thus obtained having a temperature between 120° and 125° C. is sprayed by means of a centrifuge. The ball-shaped product containing about 21 per cent of nitrogen thus obtained has a hard smooth surface.

Instead of spraying the mixture, it may also be solidified on rollers, the product comminuted and the grains suitable for fertilizing purposes sieved out.

*Example 6*

193 kilograms of finely divided calcium carbonate are introduced into 807 kilograms of an ammonium nitrate melt of 95 per cent strength kept at about 120° C. and thoroughly mixed therewith. The mixture having a temperature of about 115° C. is sprayed. The product is warmed for some time at between 80° and 100° C., while passing a current of air through it. It has a nitrogen content of about 28 per cent.

*Example 7*

138 kilograms of finely ground calcium carbonate are introduced into 862 kilograms of a hot ammonium nitrate melt of 95 per cent strength and intimately mixed therewith. The mixture is sprayed at a temperature between about 115° and about 120° C. whereby it solidifies in the form of small balls. The product has a nitrogen content of about 30 per cent and does not cake when being stored.

In the appended claims, the term "melt" is used in a broad sense, including both fused anhydrous ammonium nitrate and hot concentrated solutions thereof.

What we claim is:—

1. The process of producing a fertilizer containing ammonium nitrate which comprises introducing finely divided calcium carbonate into a melt of ammonium nitrate, while restricting the water content of the components so that their mixture contains at the most 10 per cent of water, mixing uniformly and solidifying the mixture.

2. The process of producing a fertilizer containing ammonium nitrate which comprises introducing finely divided calcium carbonate into a melt of ammonium nitrate, while restricting the water content of the components so that their mixture contains at the most 10 per cent of water, mixing uniformly and solidifying the mixture immediately after the uniform mixing of the components.

3. The process of producing a fertilizer containing ammonium nitrate which comprises introducing finely divided calcium carbonate into a melt of ammonium nitrate, while restricting the water content of the components so that their mixture contains at the most 6 per cent of water, mixing uniformly and solidifying the mixture.

4. The process of producing a fertilizer containing ammonium nitrate which comprises introducing finely divided calcium carbonate into a melt of ammonium nitrate, while restricting the water content of the components so that their mixture contains at the most 6 per cent of water, mixing uniformly and solidifying the mixture immediately after the uniform mixing of the components.

5. The process of producing a fertilizer containing ammonium nitrate which comprises introducing finely divided calcium carbonate into a melt of ammonium nitrate, while restricting the water content of the components so that their mixture contains at the most 10 per cent of water, mixing uniformly and solidifying the mixture by spraying.

6. The process of producing a fertilizer containing ammonium nitrate which comprises introducing finely divided calcium carbonate into a melt of ammonium nitrate, while restricting the water content of the components so that their mixture contains at the most 10 per cent of water, mixing uniformly and solidifying the mixture by spraying immediately after the uniform mixing of the components.

7. The process of producing a fertilizer containing ammonium nitrate which comprises introducing finely divided calcium carbonate into a melt of ammonium nitrate, while restricting the water content of the components so that their mixture contains at the most 6 per cent of water, mixing uniformly and solidifying the mixture by spraying.

8. The process of producing a fertilizer containing ammonium nitrate which comprises introducing finely divided calcium carbonate into a melt of ammonium nitrate, while restricting the water content of the components so that their mixture contains at the most 6 per cent of water, mixing uniformly and solidifying the mixture by spraying immediately after the uniform mixing of the components.

9. The process of producing a fertilizer containing ammonium nitrate which comprises introducing finely divided calcium carbonate into a melt of ammonium nitrate, while restricting the water content of the components so that their mixture contains at the most 10 per cent of water, mixing uniformly, solidifying the mixture and warming the resulting product to below its melting point.

10. The process of producing a fertilizer containing ammonium nitrate which comprises introducing finely divided calcium carbonate into a melt of ammonium nitrate, while restricting the water content of the components so that their mixture contains at the most 10 per cent of water, mixing uniformly, solidifying the mixture immediately after the uniform mixing of the components and warming the resulting product to below its melting point in a current of an inert gas.

11. The process of producing a fertilizer containing ammonium nitrate which comprises introducing finely divided calcium carbonate into a melt of ammonium nitrate in the proportion of from 90 to 30 parts by weight of ammonium nitrate to from 10 to 70 parts by weight of calcium carbonate, while restricting the water content of the components so that their mixture contains at the most 10 per cent of water, mixing uniformly and solidifying the mixture.

12. The process of producing a fertilizer containing ammonium nitrate which comprises introducing finely divided calcium carbonate into a melt of ammonium nitrate in the proportion of from about 70 to about 30 parts by weight of ammonium nitrate to from 30 to 70 parts by weight of calcium carbonate, while restricting the water content of the components so that their mixture contains at the most 10 per cent of water, mixing uniformly and solidifying the mixture.

CARL KRAUCH.
CARL EYER.
OTTO SCHLIEPHAKE.